US008001059B2

(12) United States Patent
Takezawa et al.

(10) Patent No.: US 8,001,059 B2
(45) Date of Patent: Aug. 16, 2011

(54) IT-SYSTEM DESIGN SUPPORTING SYSTEM AND DESIGN SUPPORTING METHOD

(75) Inventors: Nobuhisa Takezawa, Kanagawa (JP); Kazumi Miyagi, Kanagawa (JP); Yuuji Uenohara, Kanagawa (JP); Masatoshi Kawashima, Kanagawa (JP); Masayuki Takayama, Tokyo (JP); Hiroaki Okuda, Kanagawa (JP)

(73) Assignee: Toshiba Solutions Corporation, Tokyo (JP)

( * ) Notice: Subject to any disclaimer, the term of this patent is extended or adjusted under 35 U.S.C. 154(b) by 830 days.

(21) Appl. No.: 11/587,493

(22) PCT Filed: Apr. 28, 2005

(86) PCT No.: PCT/JP2005/008204
§ 371 (c)(1),
(2), (4) Date: Oct. 26, 2006

(87) PCT Pub. No.: WO2005/106690
PCT Pub. Date: Nov. 10, 2005

(65) Prior Publication Data
US 2007/0225948 A1    Sep. 27, 2007

(30) Foreign Application Priority Data

Apr. 28, 2004  (JP) ............................... P2004-133604

(51) Int. Cl.
*G06F 17/00*  (2006.01)
(52) U.S. Cl. ...................................... 705/400
(58) Field of Classification Search ................... 705/400
See application file for complete search history.

(56) References Cited

U.S. PATENT DOCUMENTS

| 2004/0068711 | A1* | 4/2004 | Gupta et al. | 716/18 |
| 2005/0051361 | A1* | 3/2005 | Singh et al. | 175/40 |
| 2005/0102398 | A1* | 5/2005 | Zhang et al. | 709/225 |
| 2005/0102547 | A1* | 5/2005 | Keeton et al. | 714/1 |

FOREIGN PATENT DOCUMENTS

| JP | 9-212353 | 8/1997 |
| JP | 2000-235507 | 8/2000 |

(Continued)

OTHER PUBLICATIONS

Eiseman, Marc, "Servers Based on Intel Processors Step Up to the Enterprise," LAN Magazine, v12, n2, Feb. 1997, p. 40(5).*

(Continued)

*Primary Examiner* — Nathan Erb
(74) *Attorney, Agent, or Firm* — Finnegan, Henderson, Farabow, Garrett & Dunner, L.L.P.

(57) ABSTRACT

Inputting data necessary for designing an IT system leads a throughput evaluation part to draft a system idea meeting a design standard value for throughput and leads a reliability evaluation part to draft the system idea meeting a design standard value for failure probability. A cost evaluation part evaluates a cost of the system idea, while a cost judgment part judges whether there exists a system idea whose cost evaluated by the cost evaluation part is within an allowable range or not. When the cost judgment part judges that there is no system idea, a reconfiguration part reconfigures the design standard value for throughput, the design standard value for failure probability, and the allowable range of cost in the input data part, and the reconfiguration part carries out calculations repeatedly until there can be drafted a system idea whose cost is within the allowable range.

6 Claims, 16 Drawing Sheets

FOREIGN PATENT DOCUMENTS

| JP | 2002-063218 | 2/2002 |
|----|-------------|--------|
| JP | 2002-183416 | 6/2002 |
| JP | 2003-067043 | 3/2003 |
| JP | 2003-316614 | 7/2003 |
| JP | 2004-46734  | 2/2004 |
| JP | 2004-046734 | 2/2004 |
| JP | 2004-094453 | 3/2004 |
| JP | 2004-094626 | 3/2004 |

OTHER PUBLICATIONS

Kitagawa, "Latest Designing and Investigating Technique ($2^{nd}$ edition)," Techno-system Co., Ltd. (Dec. 14, 1987), pp. (1)-(13) and 141-172.

Funakoshi et al., "Jisedai Network Architecture ni Okeru Shinraido Joken no Kento", The Institute of Electronics, Information and Communication Engineers Gijutsu Kenkyu Hokoku, vol. 100, No. 672, pp. 545-552 (2001).

Tanaka et al., "Seiyaku Jusoku Mondai o Mochiita Video Server no Segment Haichiho", ITE Technical Report, vol. 21, No. 23, pp. 13-18 (1997).

Notice of first Examination Opinion issued by the Chinese Patent Office on Jan. 4, 2008, for Chinese Patent Application No. 2005800134560, and English-language translation thereof.

English-language abstract of Kitagawa, "Latest Designing and Investigating Technique ($2^{nd}$ edition)," Techno-system Co., Ltd. (Dec. 4, 1987).

Decision of Refusal issued by the Japanese Patent Office on Mar. 23, 2010, for Japanese Patent Application No. 2004-133604, and English-language translation thereof.

Gurei Jimu, "Transaction Shori [Jo]", 1st Edition, Nikkei Business Publications, Inc., pp. 130-134 (2001).

Japanese Office Action dated Sep. 15, 2009 in corresponding JP 2004-133604, 5 pages.

Sakakibara, Yasushi, "Sizing of WWW System," Nikkei Open Systems, Nikkei BP Inc., Feb. 15, 2001, No. 95, pp. 139-159.

"Operations Management for System at Era of Net Revolution," Nikkei System Provider, Nikkei BP Inc., Dec. 22, 2000, No. 117, pp. 125-138.

* cited by examiner

IT-SYSTEM DESIGN SUPPORTING SYSTEM AND DESIGN SUPPORTING METHOD

TECHNICAL FIELD

The present invention relates to a design supporting system and a design supporting method for an IT system set up in computer network such as an online transaction system.

BACKGROUND OF ART

Designing an IT (Information Technology) system set up in computer network, such as an online transaction system, has been separately supported by different systems, one of which designs the throughput of the system and other of which designs the reliability of it.

On one hand, designing the throughput of a system has been commonly done by a discrete type simulation, in which various events are modeled from the viewpoint of a time that a serious change arises in changeable situations (see Japanese Patent Publication Laid-open No. 2002-63218).

FIG. 1 is a diagram explaining a discrete type simulation and illustrates a model of an objective system. This model represents an event where queues 101~105 are generated against a plurality of processors (circles in FIG. 1). This is called the "multistage queuing model". In this multistage queuing model, transactions arrived at the queues 101~105 per unit time are represented by the numbers $\lambda 1$~$\lambda 5$, respectively.

In addition, transactions dealt with by the processors corresponding to the queues 101~105 per unit time are represented by the numbers (throughputs) $\mu 1$~$\mu 5$, respectively. Here both the numbers $\lambda 1$~$\lambda 5$ and $\mu 1$~$\mu 5$ are supposed as parameters (variable factors) in the discrete type simulation.

Such a discrete type simulation is performed on the basis of a scenario specifying how each of the parameters must be changed. After performing the simulation, it is carried out to take measures to solve bottlenecks (throughput lacks etc.) discovered from a result of the simulation.

FIG. 2 is a flow chart showing procedures by a design supporting system for system throughput upon employing a conventional discrete type simulation technique. In this conventional design supporting system for system throughput, there is drafted a model on the ground of the following input data: constitutive instruments of the system; connections among the constitutive instruments; handling processes of the constitutive instruments; respective throughputs of the constitutive instruments; a probability that an output branches off at each node; a basic system idea; and a design standard value for system throughput (step S1). Then the discrete type simulation is performed to evaluate the system throughput (step S2).

Next, it is executed to judge whether the system throughput exceeds the design standard value or not (step S3). If the system throughput does not exceed the design standard value, then it is executed to extract a bottleneck part of the system from the simulation result and further consider an improvement idea (step S4). Thereafter, this routine returns to step S1 to draft a model of the improvement idea, and the operations at steps S1~S3 are iterated until the system throughput reaches at the design standard value. At step S3, if the system throughput exceeds the design standard value, an improvement idea at that time is adopted as the system idea (S5).

On the other hand, designing the reliability of a system has been commonly done by a fault tree analysis. The fault tree analysis is used in the designing of a plant, such as a nuclear power plant, in order to ensure the safety of the plant. In detail, it is carried out to first assume a trouble event, secondly calculate probabilities causing the trouble event, and quantitatively analyze that the occurrence probability of the trouble event is reduced to almost zero. As well as being a major analytic technique exploited in a reliability engineering and its related fields, the fault tree analysis has been adopted in designing an IT system (see Japanese Patent Publication Laid-Open No. 2003-67043, and "Latest Designing and Investigating Technique ($2^{nd}$. edition)", Kenji KITAGAWA, Dec. 14, 1987, Techno-system Co. Ltd.

In the fault tree analysis, after selecting a top event to be assumed, it is carried out to explore primary factors causing the top event to introduce a logical relation among the primary factors. Here the logical relation is expressed in the form of a tree, logic symbols (AND, OR) are inscribed under the description of the top event, and the primary factors are inscribed under the description of the logic symbols. Then the similar steps are iterated from each primary factor to secondary factors, tertiary factor, . . . , in order to segmentalize the event up to a level whose probability distribution can be determined by an experiment or the like. It is shown that the top event is generated by Boolean algebra from combinations starting from the lowest events (basic events) in the tree structure. Then it becomes possible to drive the failure probability of the top event from the failure probabilities of the basic events.

FIG. 3 is a flow chart showing procedures by a design supporting system for system reliability employing a conventional fault tree analysis. In this conventional design supporting system for system reliability, it is designed on the ground of the following input data: constitutive instruments in the system; connections among the constitutive instruments; handling processes of the constitutive instruments; a failure rate of each constitutive instrument (or subsystem) and its failure mode; a mission of each constitutive instrument (or subsystem) and its failure mode; a mission time of each constitutive instrument (or subsystem) and its failure mode; common failure causes; a basic system idea; and a design standard value for the failure probability of the system.

First, it is executed to suppose the breakdown of the system or an undesirable event in operation or performance of an objective system as a "top event", and suppose events that couldn't be decomposed any more as "basic events". Then it is performed to graphically input or/and edit a fault free structure (step S11), which is constructed from hierarchical events from the top event to the basic events, and interconnections among the hierarchical events.

Next, it is executed to convert the fault-tree data drafted at step S11 into a logical expression by Boolean algebra (step S12). Then it is executed to substitute the respective failure probabilities of the basic events into the logical expression driven at step S12 to calculate the failure probability of the top event (step S13). Next, it is executed to judge whether the system failure probability exceeds the design standard value or not (step S14). If the system failure probability does not exceed the design standard value, then it is performed to analyze the importance of each basic event, that is, how much each basic event does influence the failure probability of the top event obtained at step S13. In addition, by changing the failure probabilities of the basic events, their contribution ratios to the failure probability of the top event are calculated to seek an improvement idea (step S15). Thereafter, this routine returns to step S11 to draft a new fault tree structure for the improvement idea. In this way, a series of operations at steps S11~S14 are iterated until the system failure probability reaches at the design standard value. When the system failure probability exceeds the design standard value, an improvement idea at that time is adopted as the system idea (step S16).

DISCLOSURE OF THE INVENTION

However, in the above conventional design supporting system for an IT system set up in computer network, such as online transaction system, it should be noted that the throughput and reliability of a system are separately designed by different systems. This means that this design supporting system has no data linking structure between these systems. Therefore this design supporting system makes it difficult to design a system that meets both design specifications for system throughput and system reliability within an allowable range of cost.

That is, in spite of starting from a same basic system idea, a system idea designed from the viewpoint of the system throughput seldom coincides with another system designed from the viewpoint of system reliability. If it is desired to simultaneously meet both the design specifications for system throughput and system reliability, it causes the number of reattempts of designing work to be increased, forcing a designer to bear the remarkable burden.

The designing of system throughput and the designing of system reliability are commonly performed by experts experienced in their own ways. However, it should be noted that an expert for the designing of system throughput does not have to be an expert for the designing of system, and vice versa. Therefore, there is a possibility that a designed system does not meet the design specification for system reliability in spite of meeting the design specification for system throughput, or a designed system does not meet the design specification for system throughput in spite of meeting the design specification for system reliability. Additionally, there is a case that a designed system is provided with overquality from the viewpoint of the system reliability while meeting the design specification for system throughput, causing its cost to be beyond an allowable range. Alternatively, in the opposite case, the designed system is provided with overquality from the viewpoint of system throughput while meeting the design specification for system reliability, causing the cost to be beyond the allowable range. Such situations would cause the number of reattempts of designing work to be increased, forcing a designer to bear the remarkable burden.

An object of the present invention is to provide a design supporting system and a design supporting method for the IT system, that can provide a designing of a system which meets both design specifications, that is, a design specification for the throughput of the system and a design specification for the reliability of the system, while lightening a designer's burden and whose cost falls within an allowable range.

An aspect of the present invention provides a design supporting system for an IT system, comprising: an input data part that inputs data necessary for a designing of the IT system; a throughput evaluation part that drafts a system idea meeting a design standard value for throughput, based on the data from the input data part; a reliability evaluation part that drafts the system idea meeting a design standard value for failure probability, based on the data from the input data part; a cost evaluation part that evaluates a cost of the system idea drafted by the throughput evaluation part and the reliability evaluation part; a system-idea data storage part that stores the system idea drafted by the throughput evaluation part and the reliability evaluation part and the cost evaluated by the cost evaluation part; a cost judgment part that judges whether there exists a system idea whose cost evaluated by the cost evaluation part is within an allowable range or not; and a reconfiguration part that reconfigures the design standard value for throughput, the design standard value for failure probability and the allowable range of cost in the input data part when the cost judgment part judges that there is no system idea.

Another aspect of the present invention provides a design supporting method for an IT system, comprising: inputting data necessary for a designing of the IT system; drafting a system idea meeting a design standard value for throughput, based on the data from the input data part and also drafting a reliability evaluation part that drafts the system idea meeting a design standard value for failure probability, based on the data from the input data part; evaluating a cost of the system idea drafted by the throughput evaluation part and the reliability evaluation part; judging whether there exists a system idea whose cost evaluated by the cost evaluation part is within an allowable range or not; and when it is judged that there is no system idea meeting the allowable range of cost, reconfiguring the design standard value for throughput, the design standard value for failure probability and the allowable range of cost in the input data part, thereby obtaining a system idea meeting the allowable range of cost.

BEST MODE FOR CARRYING OUT THE INVENTION

Figure 1:
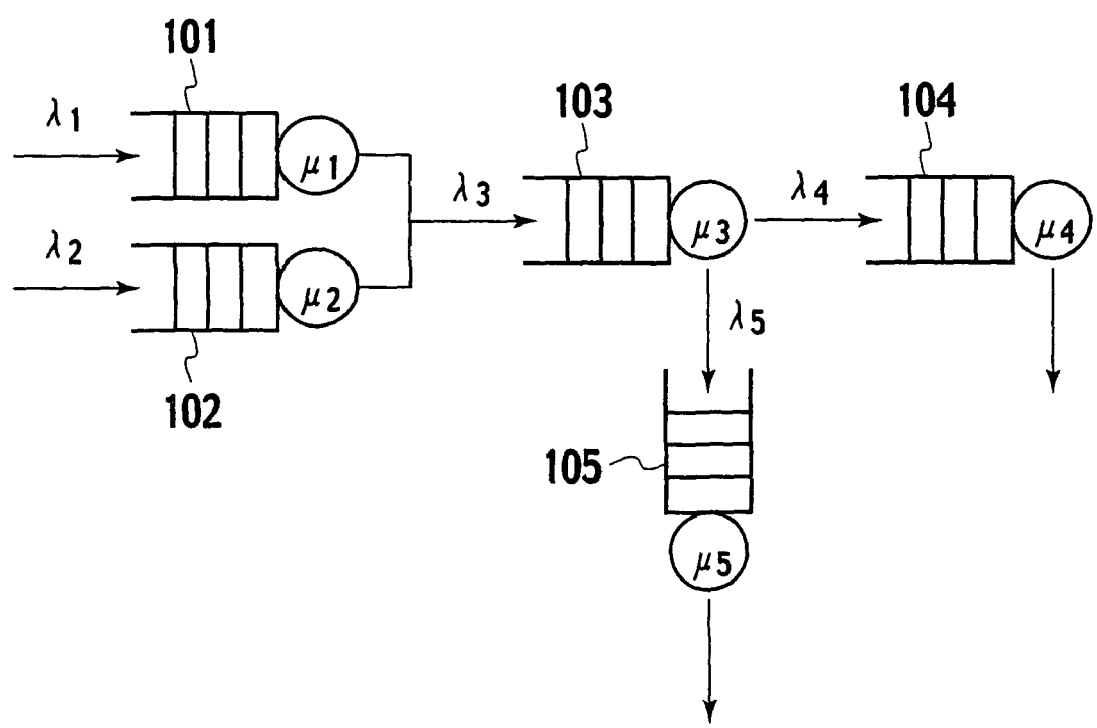
FIG. 1 is a diagram explaining a discrete type simulation.
Figure 2:
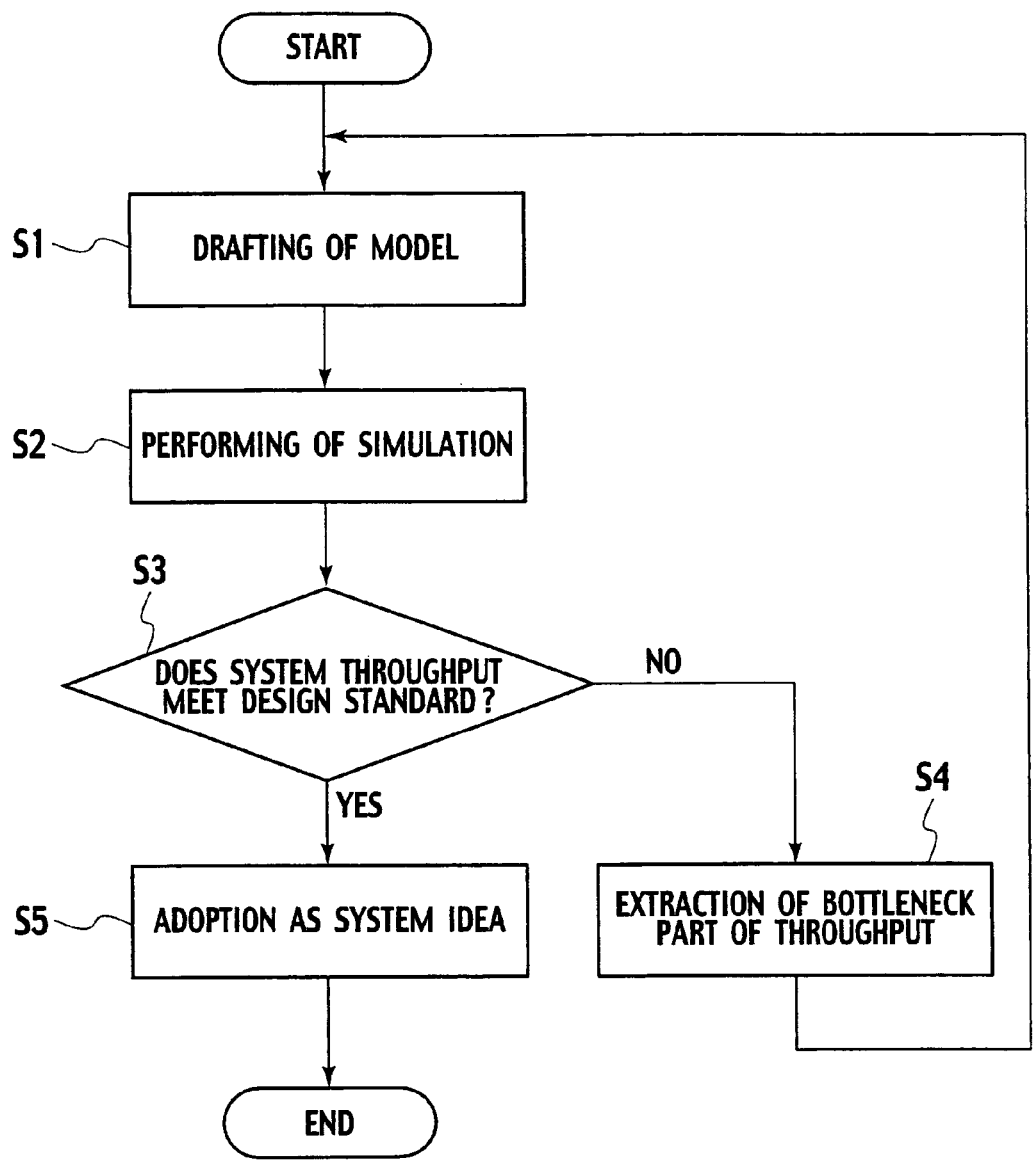
FIG. 2 is a flow chart showing procedures by a design supporting system for system throughput utilizing a conventional discrete type simulation.
Figure 3:
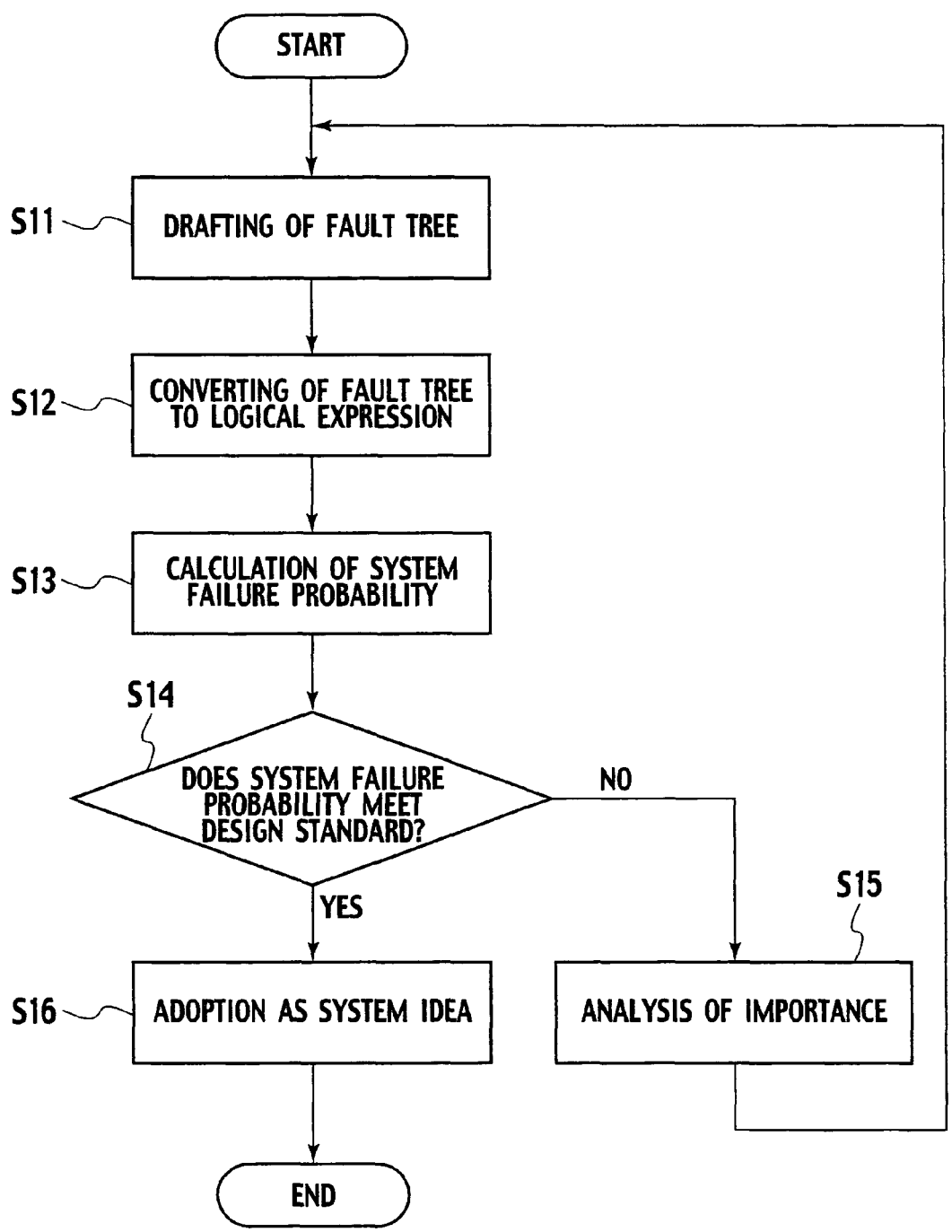
FIG. 3 is a flow chart showing procedures by a design supporting system for system reliability employing a conventional fault tree analysis.
Figure 4:
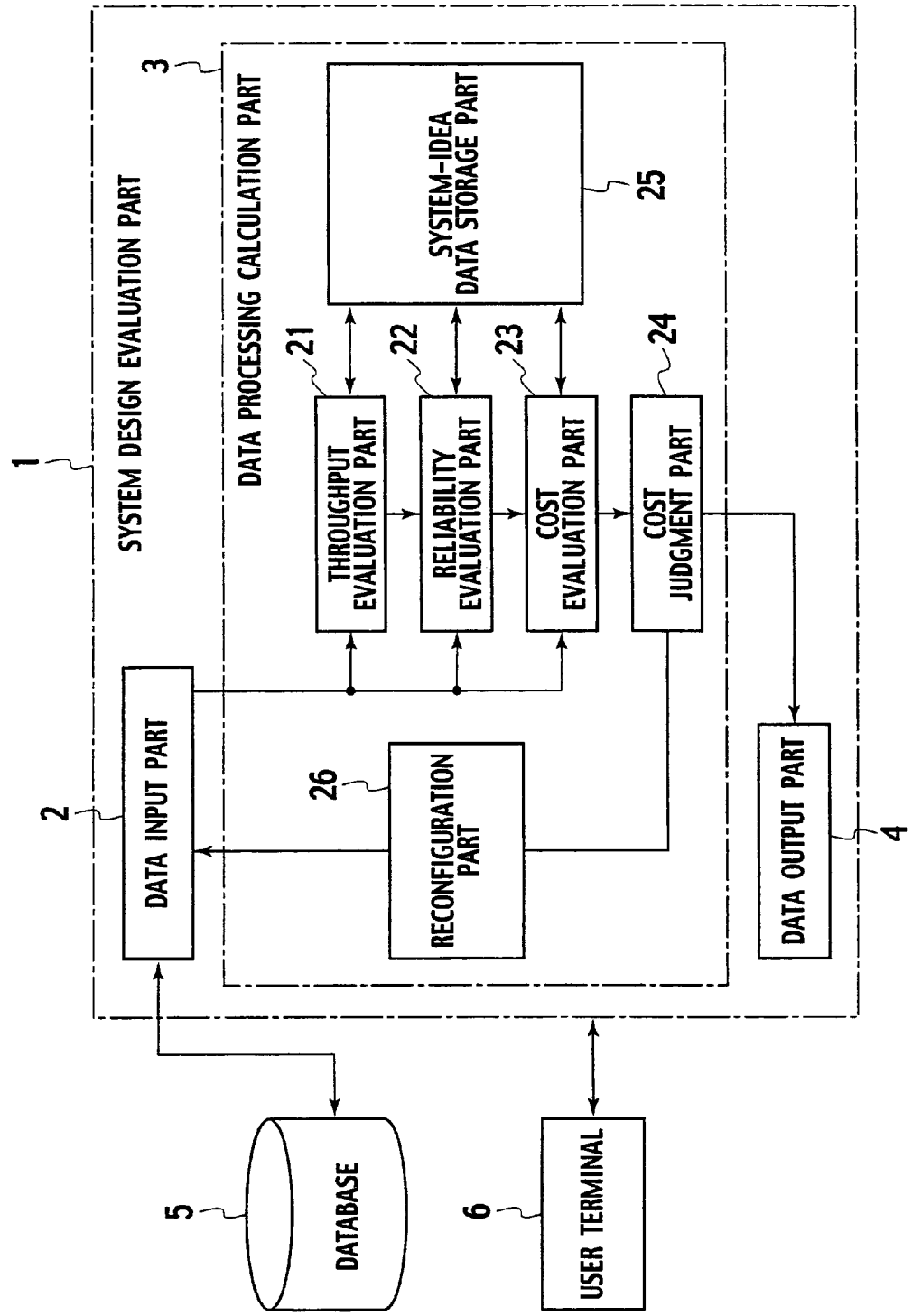
FIG. 4 is a block diagram of a design supporting system for an IT system in accordance with an embodiment of the present invention.

An embodiment of the present invention will be described below. FIG. 4 is a block diagram of a design supporting system for an IT system, in accordance with the embodiment of the present invention. In a database 5, there is stored data required to design the IT system, for example, various data related to system-function constitutive information, throughput-related information, reliability-related information and cost-related information. A system design evaluation part 1 is formed by a data input part 2, a data processing and calculating part 3 and a data output part 4. From the database 5, the data input part 2 inputs various data related to the system-function constitutive information, the throughput-related information, the reliability-related information and the cost-related information, further processes these data and outputs them to the data processing and calculating part 3. The data processing and calculating part 3 calculates a system idea which meets both a design specification for system throughput and a design specification for system reliability and whose cost falls within an allowable range and outputs the so-calculated system idea to the data output part 4. A user terminal 6 is connected to the system design evaluation part 1, transmitting various commands to the system design evaluation part 1 and also displaying a variety of information.

The data processing calculation part 3 comprises a throughput evaluation part 21 that drafts a system idea meeting a design standard value for throughput on the basis of the data from the input data part 2, a reliability evaluation part 22 that drafts the system idea meeting a design standard value for failure probability on the basis of the data from the input data part 2, a cost evaluation part 23 for evaluating a cost of the system idea drafted by the throughput evaluation part 21 and the reliability evaluation part 22, a system-idea data storage part 25 for storing the system idea drafted by the throughput evaluation part 21 and the reliability evaluation part 22 and the cost evaluated by the cost evaluation part 23, a cost judgment part 24 for judging whether there exists a system idea whose cost evaluated by the cost evaluation part 23 falls within the allowable range or not, and a reconfiguration part 26 that reconfigures the design standard value for throughput, the design standard value for failure probability and the allowable range of cost in the input data part 2 if the cost judgment part 24 judges that there is no system idea whose cost evaluated by the cost evaluation part 23 falls within the allowable range.

Figure 5:
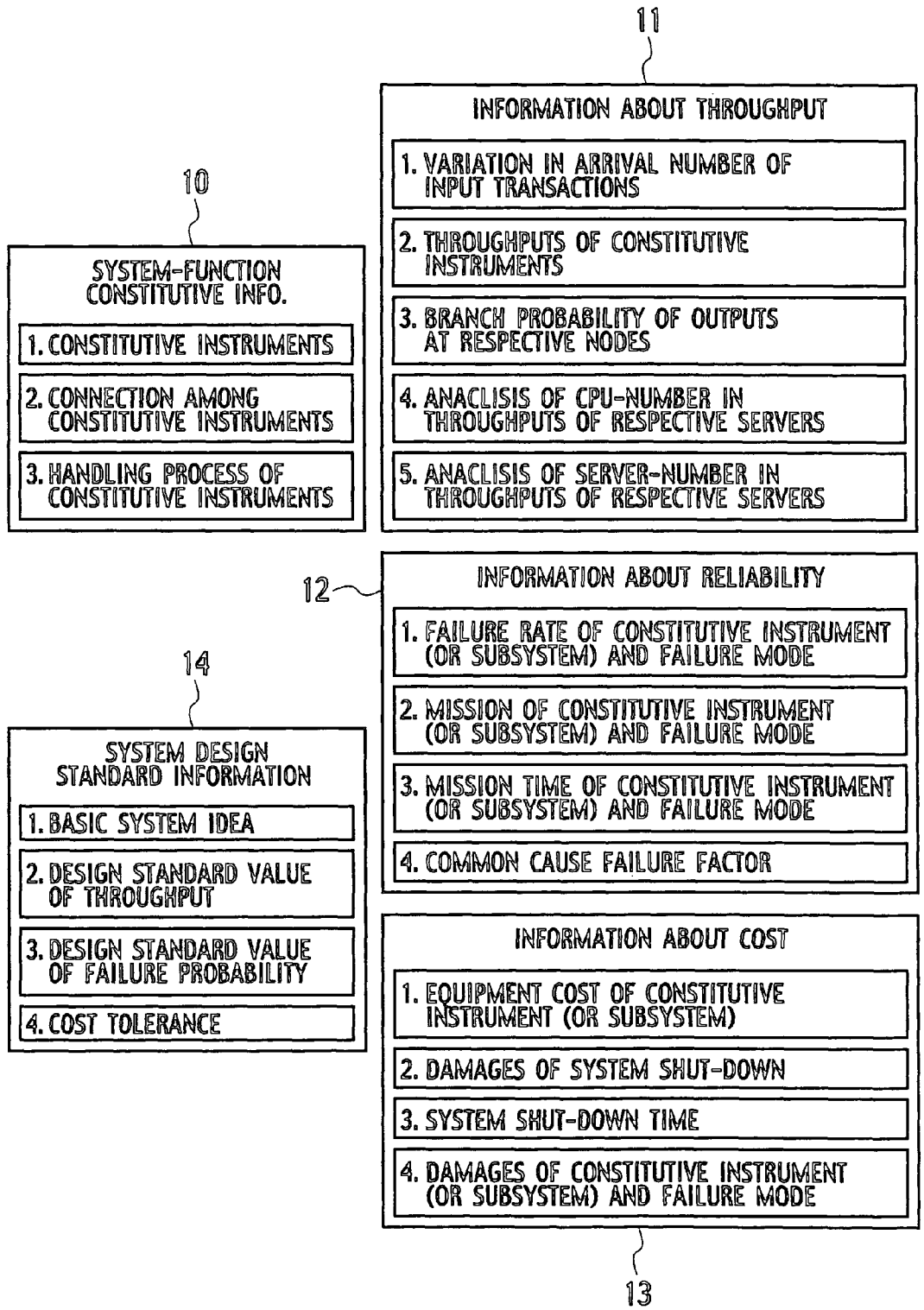
FIG. 5 is a diagram showing input information in the design supporting system for the IT system in accordance with the embodiment of the present invention.

FIG. 5 is a diagram showing input information in the design supporting system for the IT system, in accordance with the embodiment of the present invention. The input data inputted into the data input part 2 comprises a system-function constitutive information 10, a throughput-related information 11, a reliability-related information 12, a cost-related information 13 and a system-design standard information 14.

The system-function constitutive information 10 contains constitutive instruments, connections among the constitutive instruments and handling processes of the constitutive instruments. The throughput-related information 11 contains a variation in the arrival transaction number, throughputs of the constitutive instruments, a probability that an output branches off at each node, a dependency of throughput of each server on the number of CPUs and a dependency of throughput of each server group on the number of servers. The reliability-related information 12 contains failure rates of the constitutive instruments (or subsystems) and their failure modes, a mission of each constitutive instrument (or subsystem) and the failure mode, a mission time of each constitutive instrument (or subsystem) and the failure mode and common-cause failure factors. The cost-related information 13 contains equipment costs of the constitutive instruments (or subsystems), an amount of system-down damage, a system-down time and damage amounts of the constitutive instruments (or subsystems) and their failure modes. The system design standard information 14 contains a basic system idea, a design standard value for throughput, a design standard value of for failure probability and an allowable range for cost.

Figure 6:
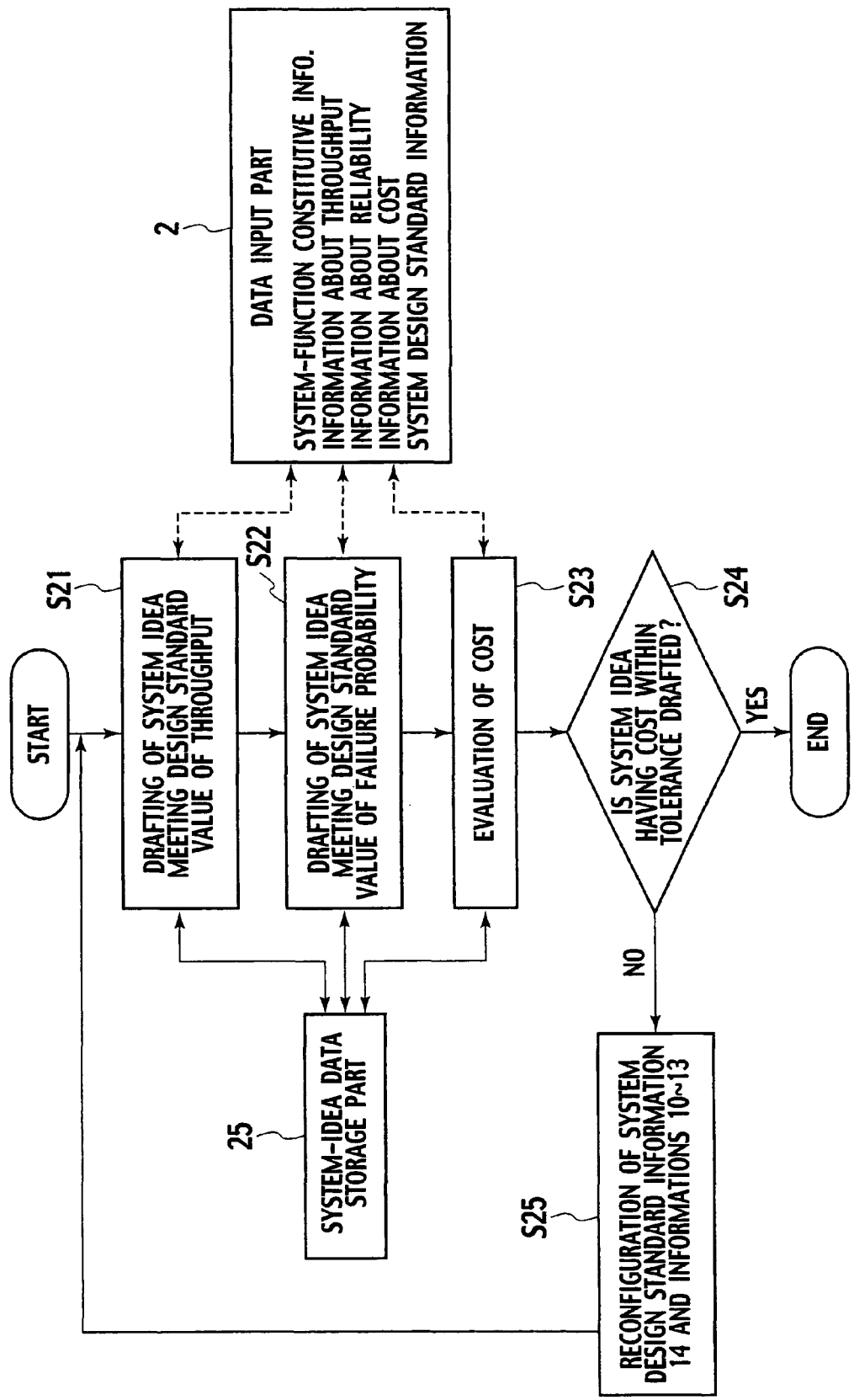
FIG. 6 is a flow chart showing procedures by a data processing and calculating part in the design supporting system of the IT system in accordance with the embodiment of the present invention.

FIG. 6 is a flow chart showing procedures by the data-processing calculating part 3 in the design supporting system of the IT system, in accordance with the embodiment of the present invention. In this data-processing calculating part 3, it is executed to receive the input data from the data input part 2 and draft a system idea meeting the design standard value for throughput at the throughput evaluation part 21 (step S21). Next, based on the drafted system idea meeting the design standard value for throughput, it is executed to draft a system idea meeting the design standard value for failure reliability at the reliability evaluation part 22 (step S22).

Next, at the cost evaluation part 23, it is executed to evaluate a cost of the drafted system idea meeting the design standard values for throughput and failure probability (step S23). Then, the cost judgment part 24 judges whether the system idea having its cost within the allowable range has been drafted or not (step S24). The system-idea data storage part 25 is adapted so as to store respective data of the system ideas drafted by the throughput evaluation part 21, the reliability evaluation part 22 and the cost evaluation part 23 and output the data to these respective parts for their utilization and reference. Additionally, the data input part 2 is also adapted so as to output the input data to the throughput evaluation part 21, the reliability evaluation part 22 and the cost evaluation part 23 for their utilization and reference.

If the cost judgment part 24 judges that there is no system idea, then the reconfiguration part 26 reconfigures the allowable range for cost, the design standard value for failure probability, the design standard value for throughput or the basic system idea of the system design standard information 14 and further reconfigures the system-function constitutive information 10, the throughput-related information 11, the reliability-related information 12 and the cost-related information 13. Thereafter, the operations from step S21 to step S24 are performed. The operations from step S21 to step S24 are performed repeatedly until a system idea that meets the so-reconfigured design standard values for throughput and failure probability and the so-reconfigured allowable range is produced.

If the cost judgment part 24 judges that the system idea has been drafted, then the system idea is outputted to the data output part 4 since there is produced a system idea meeting both the design standard values for throughput and failure probability and the cost tolerance.

Figure 7:
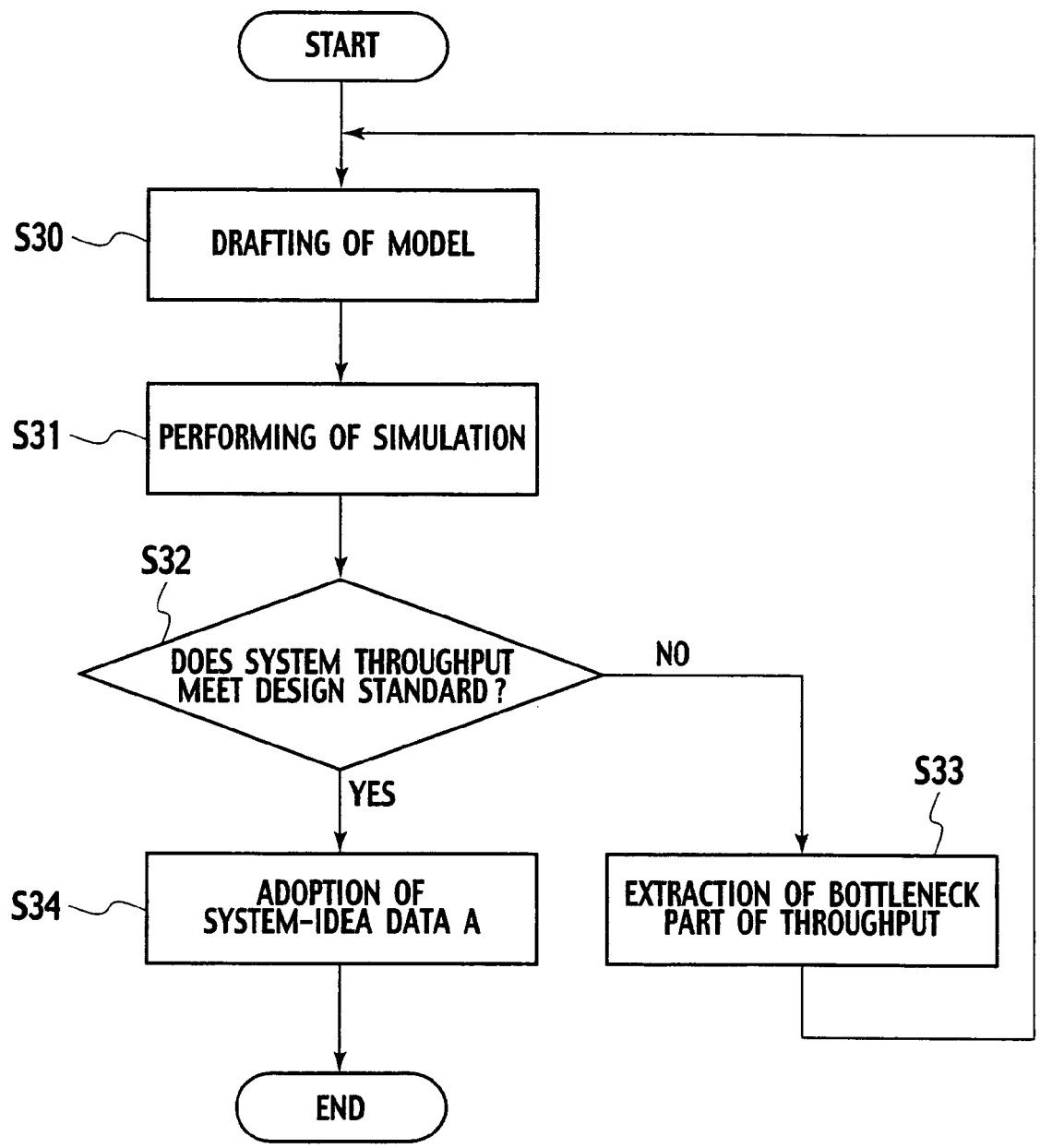
FIG. 7 is a flow chart showing procedures by a throughput evaluation part in the design supporting system for the IT system in accordance with the embodiment of the present invention.

FIG. 7 is a flow chart showing procedures by the throughput evaluation part 21 in the design supporting system for the IT system, in accordance with the embodiment of the present invention. In this throughput evaluation part 21, it is executed to draft a model of the basic system idea, based on the input data from the data input part 2 (step S30). Subsequently, the system throughput is evaluated by means of the discrete type simulation (step S32). Next, it is executed to judge whether the system throughput meets the design standard value or not (step S32). If not, a bottleneck part of the system is extracted from the simulation result, seeking an improvement idea (step S33).

Then, the routine returns to step S30 and a series of processes of steps S30 to S32 are performed repeatedly until the system throughput meets the design standard value.

If it is judged at step S32 that the system throughput meets the design standard value, the system idea is adopted as a system-idea data "A" (step S34) and successively, it is executed to store the system-idea data "A" into the system-idea data storage part 25. Thereafter, the routine goes to an operation of the reliability evaluation part 22.

Figure 8:
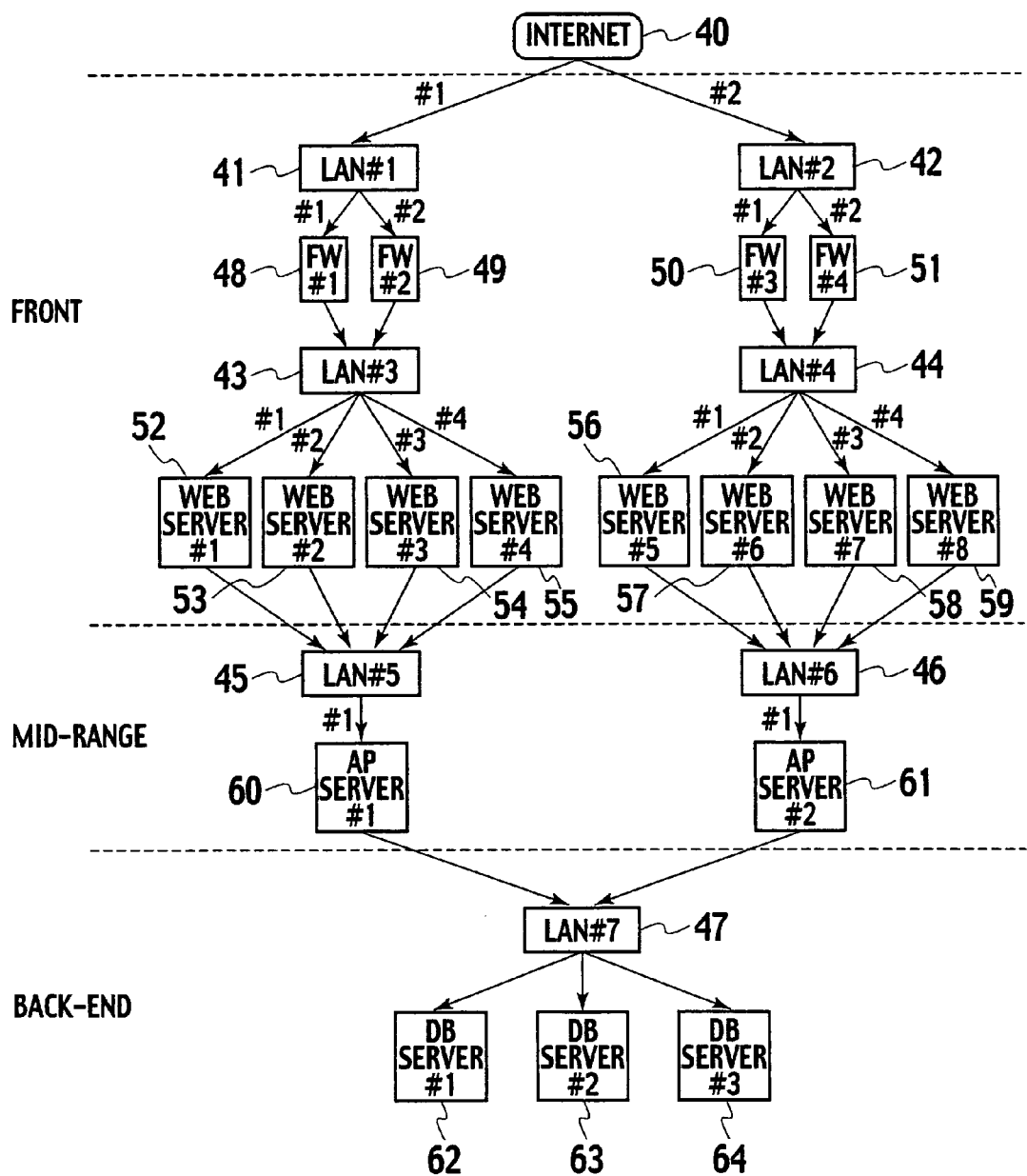
FIG. 8 is a diagram showing a model of a system idea drafted by the throughput evaluating part of the embodiment of the present invention.

FIG. 8 is a diagram showing a model of a system idea drafted by the throughput evaluation part 21, in accordance with an embodiment of the present invention. The example shown in FIG. 8 is obtained by modeling a basic system idea comprising an internet 40, LANs (Local Area Networks) 41~47, FWs (Fire Walls) 48~51, Web servers 52~59, AP (Application) servers 60~61, and DB (Data Base) servers 62~64.

Assume now that the design standard value for system throughput is 8000 cases/min, the transaction throughput of FW is 6000 cases/min/machine, the transaction throughput of Web server is 3000 cases/min/server, the transaction throughput of AP server is 2000 cases/min/server, the transaction throughput of DB server is 18000 cases/min/server and the throughput of LAN is 12000 cases/min/machine. The throughput evaluation part 21 carries out a discrete type simulation on handling the above numeric values as the input data in order to evaluate the system throughput.

Figure 9:
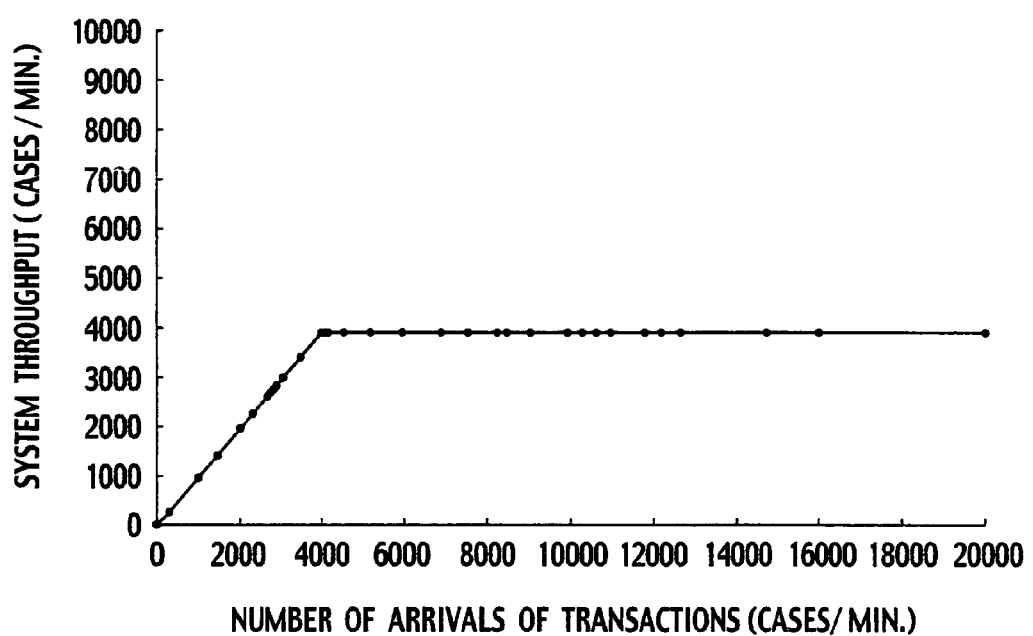
FIG. 9 is a graph showing a result of a simulation performed by the throughput evaluating part in the embodiment of the present invention, which represents a relationship between system throughput and transaction arrival number.

FIG. 9 is a graph showing a result of a simulation performed by the throughput evaluation part 21 in this case, which represents a relationship between the system throughput and the arrival number of transactions. As shown in FIG. 9, the system throughput is saturated at 4000 cases/min and cannot reach 8000 cases/min as the design standard value for the system throughput. This is because the system is provided with only two AP servers each having 2000 cases/min in the transaction throughput.

Figure 10:
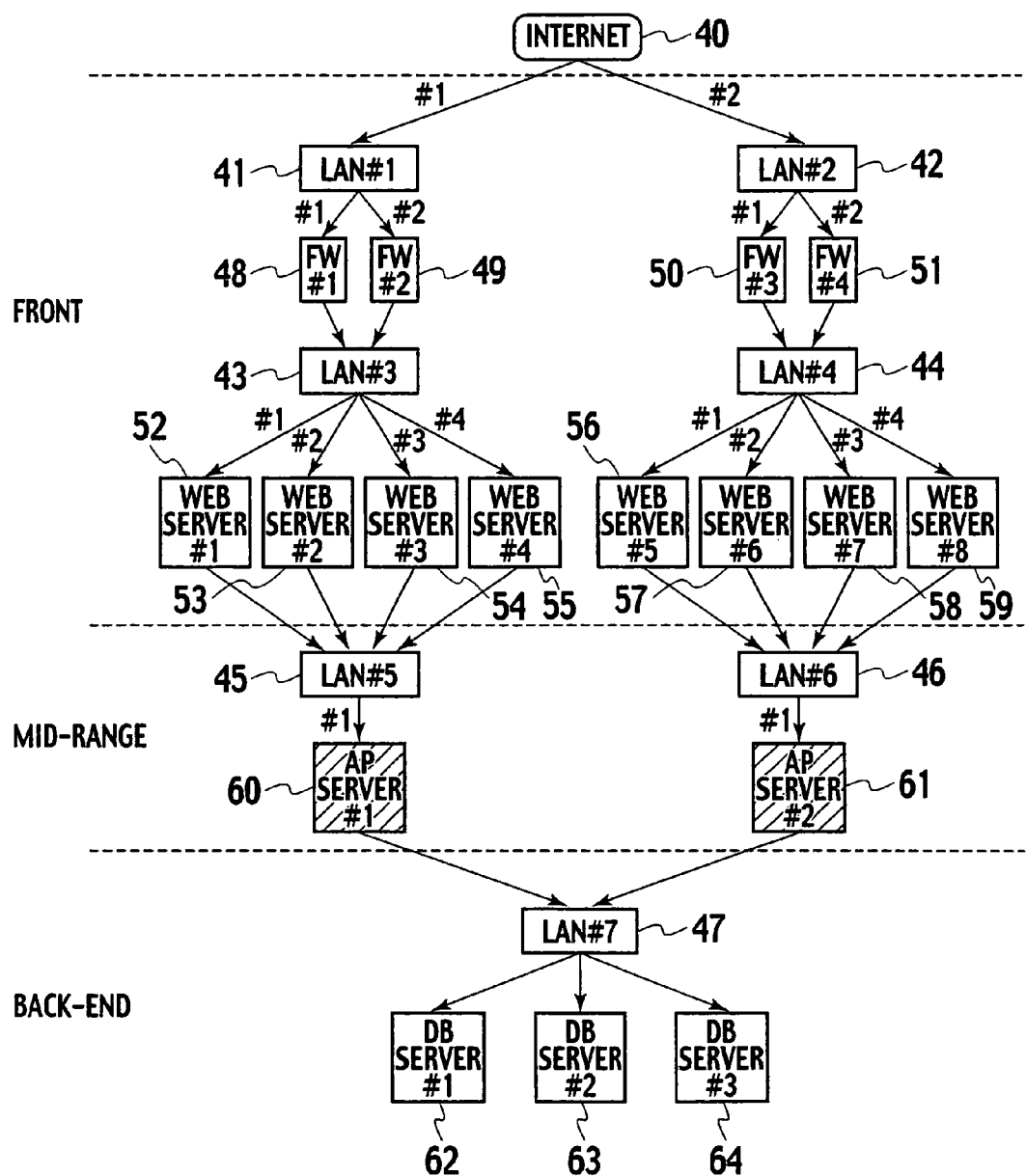
FIG. 10 is a diagram showing bottleneck parts extracted from the model of FIG. 8 in a throughput bottleneck extracting process by the throughput evaluation part.

FIG. 10 is a model diagram showing bottleneck parts (shadow areas) extracted from the model of FIG. 8 in the throughput bottleneck extracting process (step S33) by the throughput evaluation part 21. As shown in FIG. 10, it will be understood that AP servers 60, 61 correspond to the bottleneck parts, respectively.

Therefore, the transaction throughputs of the AP servers 60, 61 are increased more than 2000 cases/min/server for improvement and it is further carried out to acquire a result of the system throughput's dependency to the arrival number of transactions in the simulation by the throughput evaluation part 21 again. For instance, the improvement idea is formed by changing the transaction throughputs of the AP servers 60, 61 from 2000 cases/min/server to 4000 cases/min/server each.

Figure 11:
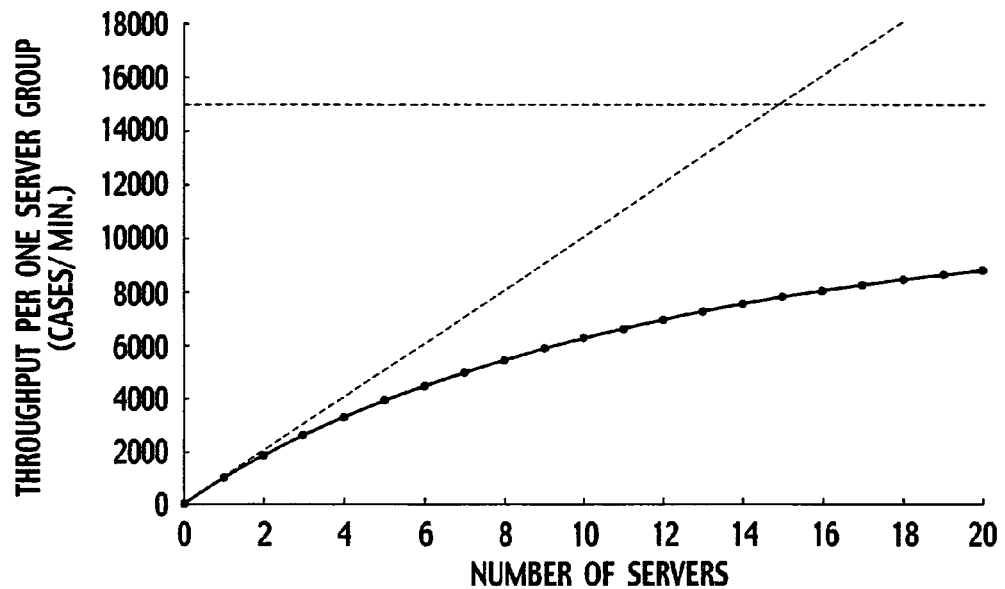
FIG. 11 is a graph showing a result of a simulation performed by the throughput evaluation part in the embodiment of the present invention, which represents a relationship between system throughput and the arrival transaction number in an improvement idea.

FIG. 11 is a graph showing a result of a simulation performed by the throughput evaluation part 21 in that case, which represents a relationship between the system throughput and the arrival transaction number. Then, since the system contains two AP servers each having 4000 cases/min/server in the transaction throughput, the system throughput is saturated at 8000 cases/min/server, accomplishing the design standard value for the system throughput, i.e. 8000 cases/min. Accordingly, this idea is adopted as a system-idea data A and stored in the system data storage part 25.

In this way, according to the system idea, it is executed to change the transaction throughputs of the AP servers 60, 61 to 4000 cases/min/server each. In this case, there exist three concepts as the improvement idea. First, a first concept is to simply alter the present AP servers to other servers each having a throughput more than 4000 cases/min/server.

Upon regarding the AP servers in the model diagram of the system idea of FIG. 8 as a server group having some servers collected, a second concept is to alter the present server group to another server group having its throughput per one server group more than 4000 cases/min. For instance, as shown in FIG. 12, there are prepared four servers 70~73 each having a throughput of 1000 cases/min, establishing one AP server group.

Upon regarding the AP servers 60, 61 in the model diagram of the system idea of FIG. 8 as a multi-CPU server having some CPUs collected, a third concept is to alter the present server to another server having its throughput per one server more than 4000 cases/min. For instance, as shown in FIG. 13, there is prepared an AP server formed by four CPUs 74~77 each having a throughput of 1000 cases/min.

According to the embodiment, as the system-idea data, the system ideas in accordance with these tree concepts are stored in the system-idea data storage part 25, while the reliability evaluation part 22 can select any one of the system ideas. As the system-idea data, the system of the embodiment is constructed so as to allow the system ideas along the three concepts to be selected with respect to each server in the system idea. Consequently, as the number of servers and the number of CPUs can be modified without almost changing the throughput of each server, it is possible to alter the failure probability of the system while maintaining the design specification values in terms of system throughput.

Figure 12:
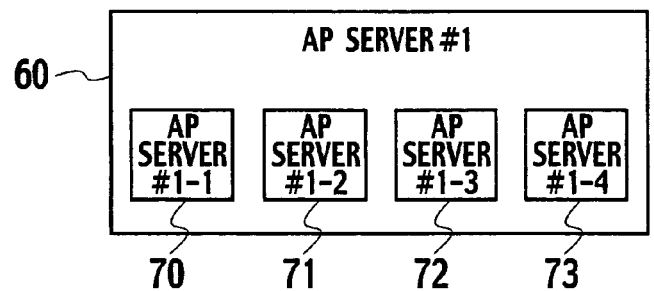
FIG. 12 is a diagram showing an improvement idea from the throughput evaluation part that four servers, each having the throughput of 1000 cases/min., are prepared to form a single AP server group, in accordance with the embodiment of the present invention.
Figure 14:
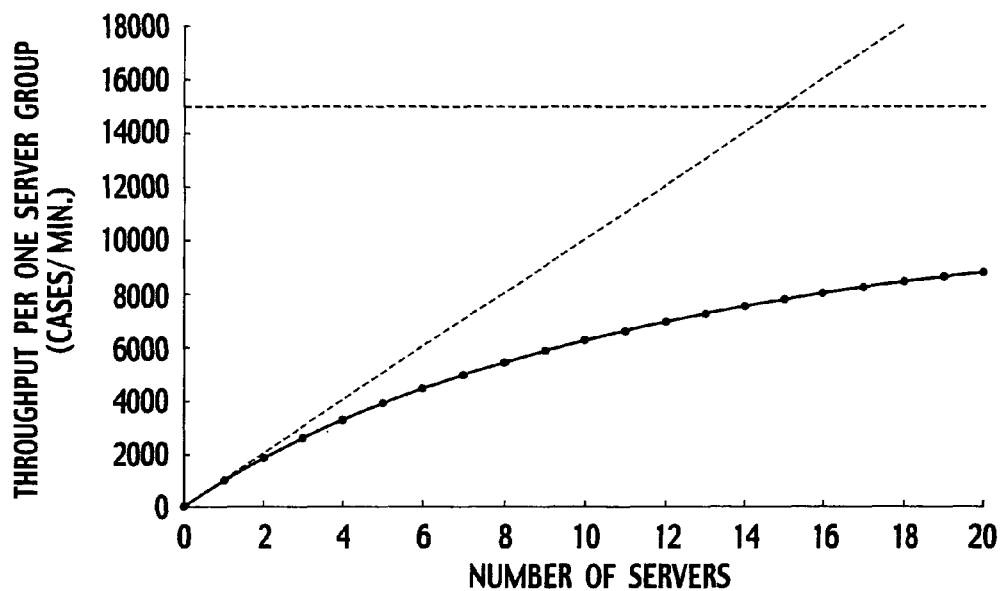
FIG. 14 is a graph showing an example of data that represents a throughput per one server group on the number of servers, which is used in an evaluation process by the throughput evaluation part, in accordance with the embodiment of the present invention.

Here, it is noted that FIG. 12 shows an example of assumption where the throughput per one server group is proportional to the number of servers. However, it is generally known that the throughput per one server group becomes out of proportion gradually as the number of servers gets increased, due to various factors. In such a case, for each server group, a more realistic value in the number of servers required for the throughput of each server group is determined with reference to data about dependency of the throughput per one server group on the number of servers, which is shown in FIG. 14.

Figure 13:
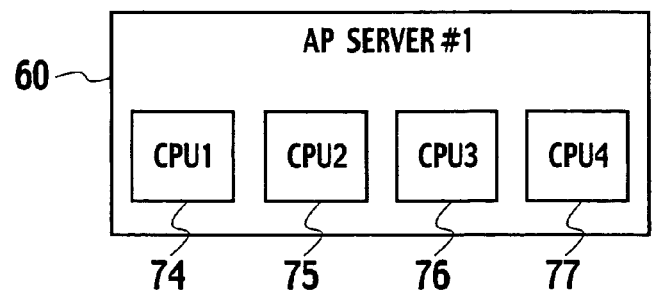
FIG. 13 is a diagram showing an improvement idea of the throughput evaluation part that four CPUs, each having a throughput of 1000 cases/min., are prepared to form an AP server, in accordance with the embodiment of the present invention.
Figure 15:
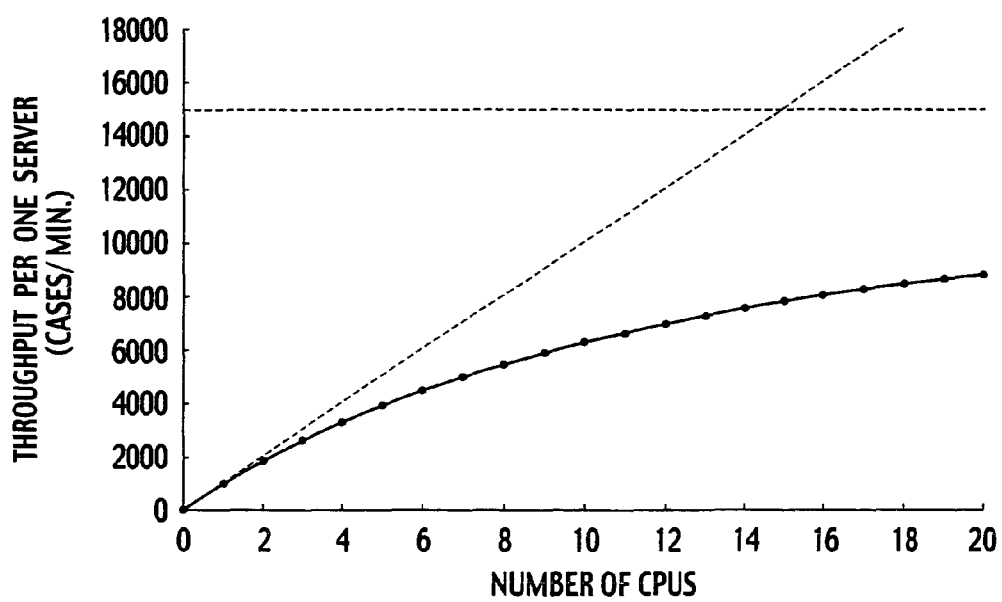
FIG. 15 is a graph showing an example of data that represents a throughput per one multi-CPU server on the number of CPUs, which is used in an evaluation process by the throughput evaluation part, in accordance with the embodiment of the present invention.

Additionally, it is noted that FIG. 13 shows an example of assumption where the throughput of one multi-CPU server is proportional to the number of CPUs. However, it is generally known that the throughput per one multi-CPU server becomes out of proportion gradually as the number of CPUs gets increased, due to various factors. In such a case, for each server, a more realistic value in the number of CPUs required for the throughput of each server is determined with reference to data about dependency of the throughput per one server on the number of CPUs, which is shown in FIG. 15.

Figure 16:
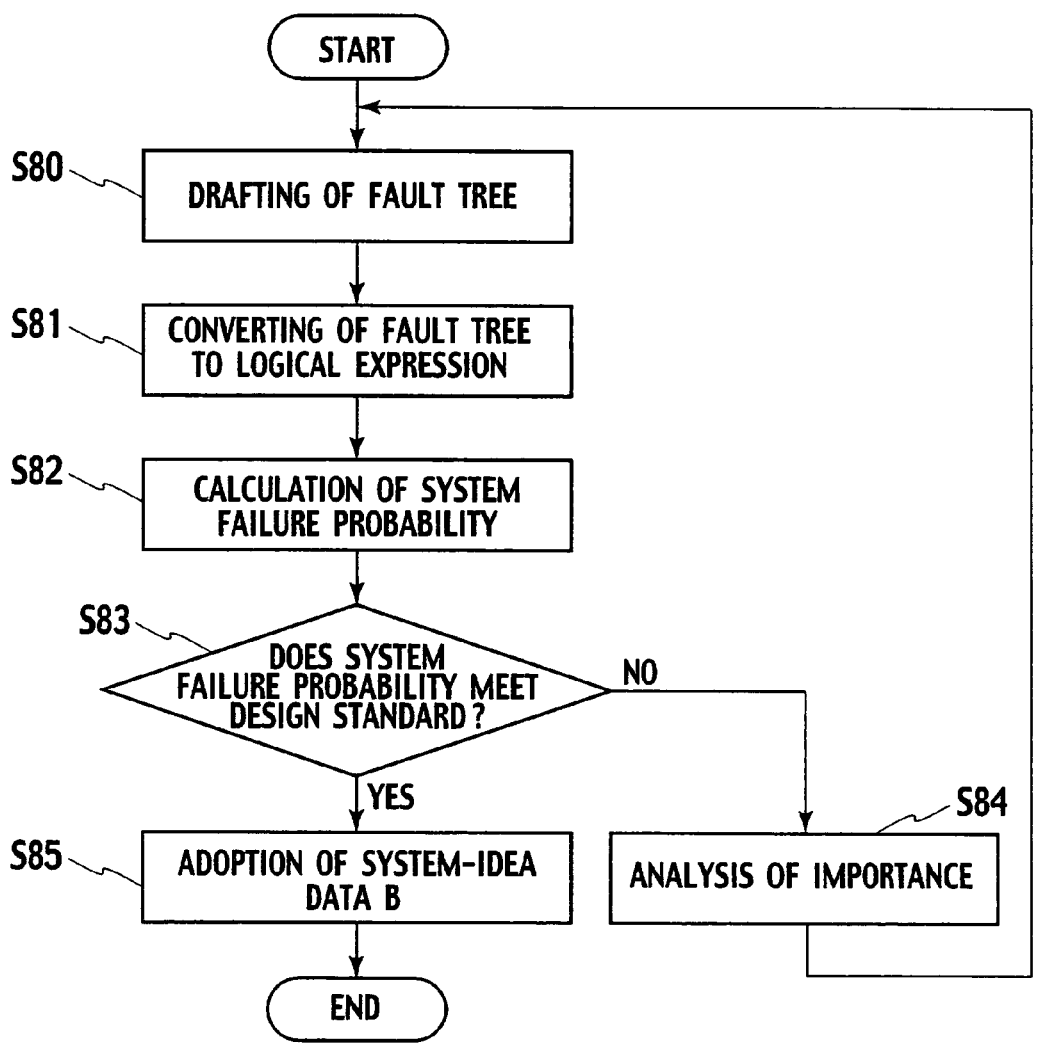
FIG. 16 is a flow chart showing procedures by a reliability evaluation part in accordance with the embodiment of the present invention.

Next, FIG. 16 is a flow chart showing procedures by the reliability evaluation part 22, in accordance with the embodiment of the present invention. The reliability evaluation part 22 drafts a fault tree (step S80), converts the fault tree to a logical expression (step S81), calculates a system failure probability (step S82), judges whether the system failure probability meets a design standard or not (step S83), performs an analysis of importance if the system failure probability does not meet the design standard (step S84) and further returns to step S80 and adopts a system-idea data B when the system failure probability meets the design standard (step S85).

At first, it is performed to graphically input or/and edit a fault free structure, based on the system idea meeting the design standard value for throughput drafted by the throughput evaluation part 21 (step S80). Assume that a breakdown and undesirable event in the operation or performance of an objective system is defined as "top event", while an event having its factor that couldn't be quested any more is defined as "basic event". In the above fault free structure, a variety of events (from the top event to the basic events) are hierarchically developed and connected with each other through logic symbols, in accordance with a relationship between event and its factor.

Next, it is executed to convert the fault-tree data obtained at step S80 into the logical expression by Boolean algebra (step S81). In succession, it is executed to calculate a failure probability of the top event by substituting respective failure probabilities of the basic events into Boolean algebra (step S82). Next, it is executed to judge whether the system failure probability meets the design standard value or not (step S83). When it is judged that the system failure probability does not meet the design standard value, it is performed to analyze how much each basic event does influence the failure probability of the top event and further calculate a contribution ratio on the failure probability of the top event by varying the failure probabilities of the basic events, thereby considering an improvement idea (step S84). Then, returning to step S80, it is executed to draft a fault tree structure as the improvement idea. That is, a series of processes from step S80 to step S83 are performed repeatedly until the system failure probability meets the design standard value.

If it is judged at step S83 that the system failure probability meets the design standard value, the system idea is adopted as the system-idea data (step S85) and this system-idea data "B" is stored in the system-idea data storage part 25. Subsequently, the routine goes to a process by the cost evaluation part 23.

Figure 17:
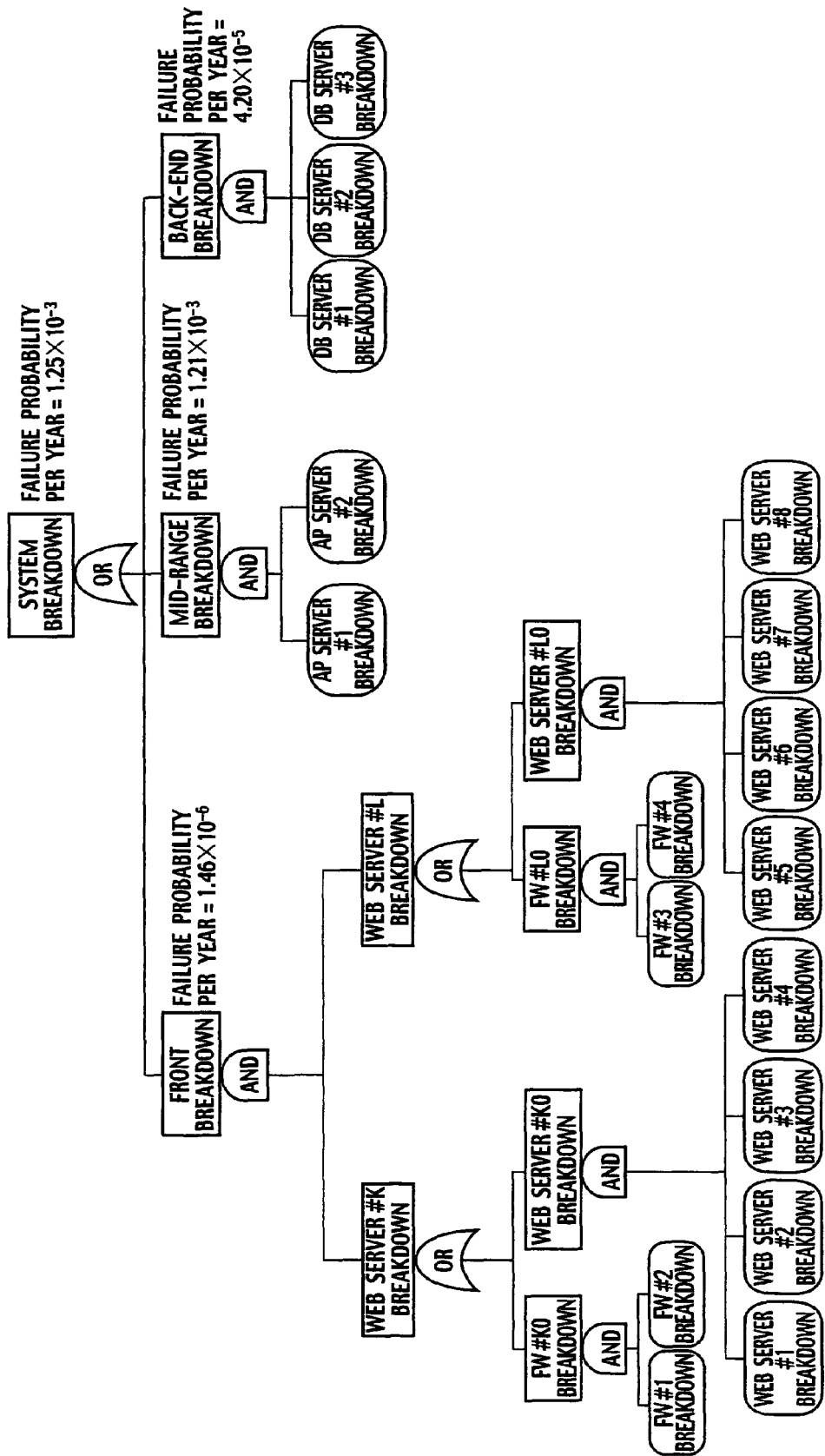
FIG. 17 is a diagram showing an example of a system drafted by the reliability evaluation part and a calculation result of failure probabilities of the system, in accordance with the embodiment of the present invention.

FIG. 17 shows an example of a fault tree drafted in the fault-tree drafting process (step S80) by the reliability evaluation part 22 when establishing a system breakdown as the top event with respect to the system idea of FIG. 8. In the figure, an "OR" event designates an event that if any one of its lower events has a loss of function, the upper events would lose their functions. A functio-laesa (loss of function) probability "q" of the "OR" event is calculated by an expression 1 through Boolean algebra. In the expression 1, "qj" designates a functio-laesa probability of a lower event "j", while "N" is the total number of lower events.

$$q = 1 - \prod_{j=1}^{N}(1-q_j) \quad \text{[Expression 1]}$$

Further, an "AND" event designates an event that if all the lower events have a loss of function each, the upper events would lose their functions as well. A functio-laesa (loss of function) probability "q" of the "AND" event is calculated by an expression 2 through Boolean algebra.

$$q = \prod_{j=1}^{N} q_j \quad \text{[Expression 2]}$$

In the fault-tree conversion process (step S81), with the use of the expressions 1 and 2, the fault free of FIG. 17 is converted to the logical expression by Boolean algebra (step S81). Next, in the system failure probability calculating process (step S82), the failure probability of the top event is calculated by substituting respective failure probabilities of the basic events.

Suppose that the design standard value of the failure probability per year of the system is $1.0 \times 10^{-4}$, the failure probability per year of FW=$3.48 \times 10^{-2}$ (per month: $3.0 \times 10^{-3}$), the failure probability per year of Web server=$3.48 \times 10^{-2}$ (per month: $3.0 \times 10^{-3}$), the failure probability per year of AP server=$3.48 \times 10^{-2}$ (per month: $3.0 \times 10^{-3}$), and the failure probability per year of DB server=$3.48 \times 10^{-2}$ (per month: $3.0 \times 10^{-3}$).

In the reliability evaluation part 22, it is performed to calculate a failure probability of the system from the above values as the input data.

FIG. 17 is a diagram showing the fault tree drafted by the reliability evaluation part 22 in this case and an example of the calculation result of the failure probability of the system. In this case, the failure probability per year of the system amounts $1.25 \times 10^{-3}$, exceeding the design standard value of the failure probability of the system. Therefore, in the analyzing process of importance by the reliability evaluation part 22 (step S84), it is performed to analyze how much an individual basic event does influence the failure probability of the top event. Consequently, as it is found that the contribution ratio of AP server is the highest, an improvement idea for AP server is considered.

Figure 18:
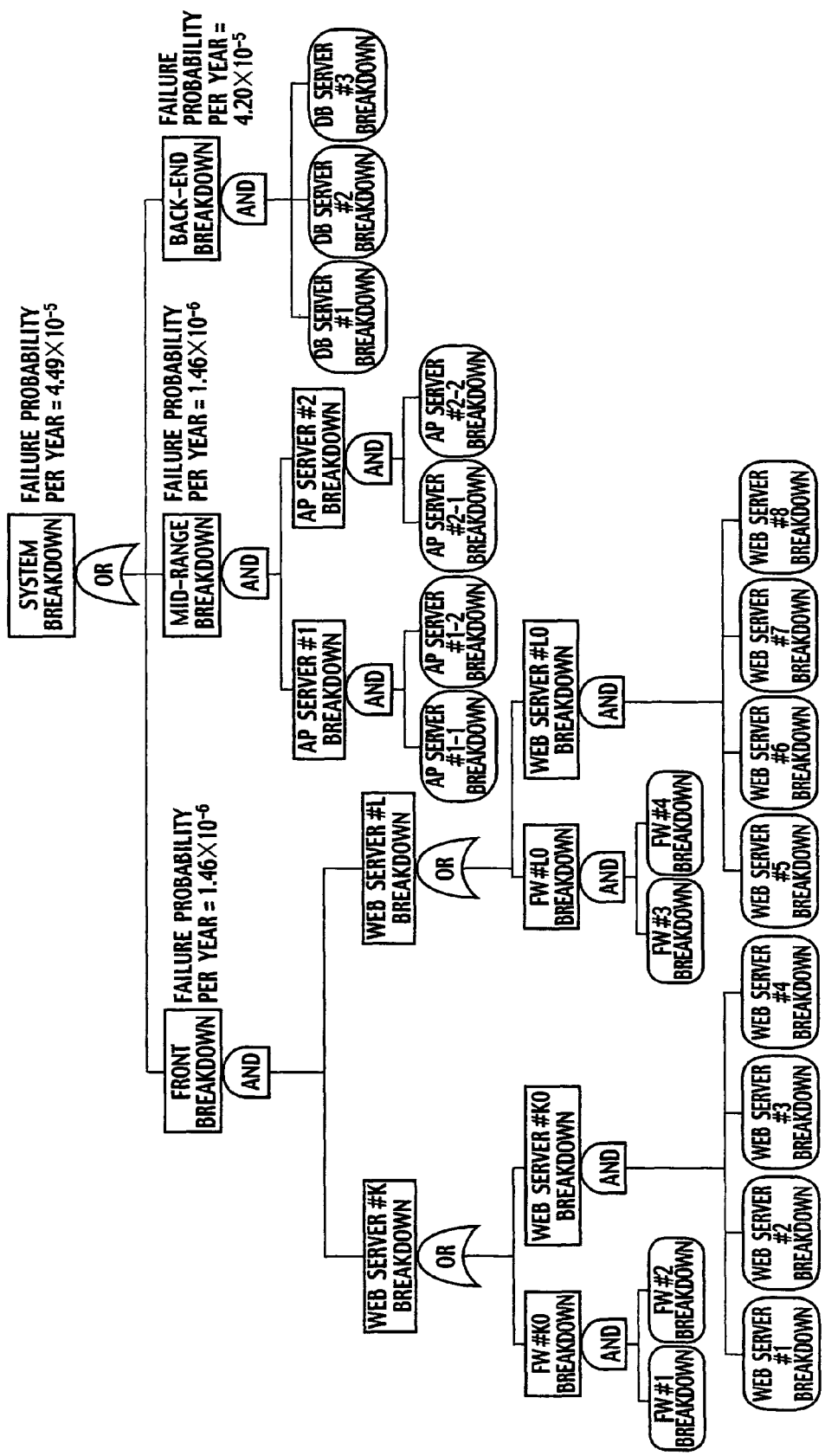
FIG. 18 is a diagram showing an example of a system in an improvement idea drafted by the reliability evaluation part and a calculation result of failure probabilities of the system, in accordance with the embodiment of the present invention.

Then, it is performed to utilize the system-idea data which has been adopted by the throughput evaluation part 21 and stored in the system-idea data storage part 25. In this instance, the AP server is regarded as a server group where some servers are gathered. Thereupon, while maintaining 4000 cases/min in the throughput per one server group upon, two servers having a throughput of 2000 cases/min each are prepared to form one AP server group. On the assumption that the failure probability (=$3.48 \times 10^{-2}$) of a single server per year does not change, the failure probability of the system about the improvement idea is calculated by a system failure probability calculation part 42. The result of calculation is shown in FIG. 18.

In this case, the failure probability per year of the system amounts $4.49 \times 10^{-5}$, dipping from $1.0 \times 10^{-4}$ as the design standard value of the failure probability of the system. Then, this improvement idea is adopted as a system-idea data "B" and stored in the system-idea data storage part 25.

Regarding the drafting of an improvement idea, when the throughput of a single server group becomes out of proportion to the number of servers gradually as it gets increased, as mentioned before, a more realistic value in the number of servers required for the throughput of the server group is determined with reference to data about dependency of the throughput per one server group on the number of servers, which is shown in FIG. 14. In this instance, it is also supposable as one improvement idea to prepare servers having a throughput of 1000 cases/min each, providing one AP server group. In such a case, it is found in accordance with the teaching of FIG. 14 that five servers are required in order to maintain 4000 cases/min in the throughput per one server group.

Figure 19:
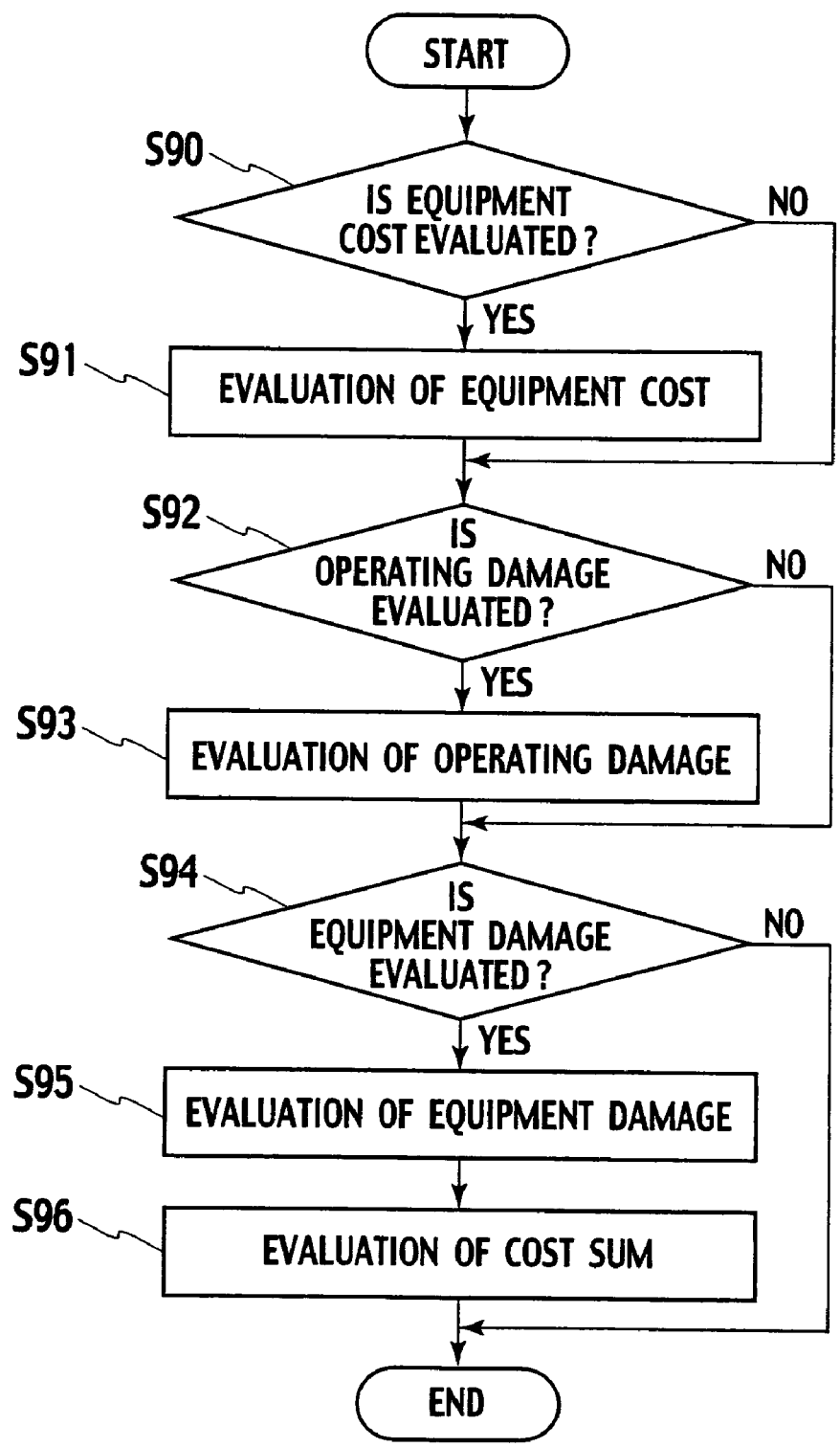
FIG. 19 is a flow chart showing procedures by a cost evaluation part in the design supporting system of the IT system.

FIG. 19 is flow chart showing procedures by the cost evaluation part 23, in accordance with the embodiment of the present invention. The cost evaluation part 23 contains an equipment-cost evaluation selecting process (step S90) to select whether the equipment cost should be evaluated or not, an equipment-cost evaluating process (step S91) to evaluate the equipment cost, an operating-damage evaluation selecting process (step S92) to select whether an amount of operating damage should be evaluated or not, an operating-damage evaluating process (step S93) to evaluate the amount of operating damage, an equipment-damage evaluation selecting process (step S94) to select whether an amount of the equipment damage should be evaluated or not, an equipment-damage evaluating process (step S95) to evaluate the amount of the equipment damage and a cost-sum evaluating process (step S96) to evaluate a sum of costs.

If it is selected to evaluate the equipment cost (step S90), it is executed to calculate a sum of installation costs of the constitutive instruments (or subsystems) of the cost-related information 13 with respect to a system idea meeting both design standard values for throughput and failure probability drafted by the throughput evaluation part 21 and the reliability evaluation part 22 (step S91). Next, the routine goes to the operating-damage evaluation selecting process (step S92). If it is not selected to evaluate the equipment cost in the equipment-cost evaluation selecting process (step S90), the routine bypasses the equipment-cost evaluating process (step S91) and goes to the operating-damage evaluation selecting process (step S92) to select whether the amount of the operating damage is to be evaluated or not.

Next, if it is selected to evaluate the amount of operating damage in the operating-damage evaluation selecting process (step S92), it is executed to calculate an expected value of the amount of operating damage with respect to a system idea meeting design standard values for both throughput and failure probability drafted by the throughput evaluation part 21 and the reliability evaluation part 22, by an expression 3 using a system failure probability, an amount of system-down damage and a system-down time in the cost related information 13, Expected Operating Damage Value=System Failure Probability×System-down Damage×Average System-down Time [Expression 3]

Next, the routine goes to the equipment-damage evaluation selecting process (step S94). Again, if it is not selected to evaluate the amount of operating damage in the operating-damage evaluation selecting process (step S92), the routine bypasses the operating-damage evaluating process (step S93) and goes to the equipment-damage evaluation selecting process (step S94).

If it is selected to evaluate the amount of equipment damage in the equipment-damage evaluation selecting process (step S94), then the routine goes to the equipment-damage evaluating process (step S95). In the equipment-damage evaluating process (step S95), for the system idea meeting the design standard values for both throughput and failure probability drafted by the throughput evaluation part 21 and the reliability evaluation part 22, it is executed to calculate a failure probability of the constitutive instrument (or subsystem) and its failure mode with the use of a failure rate of the constitutive instrument (or subsystem) in the reliability related information 12 and its failure mode and a mission time of the constitutive instrument (or subsystem) and its failure mode. Further, using an amount of damage of the constitutive instrument (or subsystem) in the cost related information 13 and its failure mode, it is executed to calculate an expected value of the amount of damage of the constitutive instrument (or subsystem) and its failure mode by an expression 4. In this way, by calculating a sum of expected values of respective damages of the constitutive instruments (or subsystems) and their failure modes, an expected value of equipment damage is obtained.

Expected Damage Value of Constitutive Instrument (or Subsystem) and Failure mode=Failure Probability of Constitutive Instrument (or Subsystem) and Failure mode×Damage Amount of Constitutive Instrument (or Subsystem) and Failure mode [Expression 4]

Next, the routine goes to the cost-sum evaluating process (step S96). Again, if it is not selected to evaluate the amount of equipment-damage in the equipment-damage evaluation selecting process (step S94), the routine bypasses the equipment-damage evaluating process (step S95) and goes to the cost-sum evaluating process (step S96).

In the cost-sum evaluating process (step S96), it is executed to calculate a total of costs corresponding to so-selected items with respect to the system idea meeting the design standard values for both throughput and failure probability drafted by the throughput evaluation part 21 and the reliability evaluation part 22. That is, if it is selected to evaluate an equipment cost, the equipment cost calculated in the equipment-cost evaluating process (step S90) is incorporated to a cost calculation. Similarly, if it is selected to evaluate an amount of operating damage, an expected value of the amount of operating damage calculated in the operating-damage evaluating process (step S91) is incorporated to the cost calculation. Further, if it is selected to evaluate an amount of equipment-damage, an expected value of the amount of equipment-damage calculated in the equipment-damage evaluating process (step S92) is incorporated into the cost calculation.

In this way, the designing of reliability is carried out after designing the system throughput and subsequently, the evaluation of cost is performed. In this regard, the system is constructed so as to allow the system-idea data to be referred for utilization mutually. When designing the system reliability, for each server in the system idea, it is possible to form the system-idea data upon selecting one from three following situations of:

(1) Setting each server in the system idea so that a throughput more than a predetermined value is satisfied with one server;

(2) Regarding the servers as a server group of two or more severs and setting so that a throughput more than a predetermined value can be satisfied with a total of respective throughputs of the servers forming the server group; and (3) Regarding the servers as a multiple-CPU server having two or more CPUs and setting so that a throughput more than a predetermined value can be satisfied with a total of respective throughputs of the CPUs forming the multiple-CPU server.

Consequently, when designing the system reliability, it is possible to alter either the number of servers forming the system idea or the number of CPUs in the server while maintaining the system throughput of the system idea more than its design standard value without returning to the designing of throughput again. Thus, without performing a complicated design working, it is possible to modify the system idea so as to meet the design specification for system failure probability while maintaining the design specification for system throughput.

According to the first embodiment, when altering the number of servers in the server group of the system idea, a more realistic value in the number of servers required for the throughput of each server group is determined with reference to the dependency data between the throughput per one server group and the number of servers. Similarly, when altering the number of CPUs in the server of the system idea, a more realistic value in the number of CPUs required for the throughput of each server is determined with reference to the dependency data between the throughput per one server and the number of CPUs. Accordingly, it is possible to realize a designing which lightens a designer's burden and meets both of the design specification for system throughput and the design specification for reliability and whose cost falls within an allowable range.

INDUSTRIAL APPLICABILITY

According to the present invention, it is possible to provide a designing which meets both a design specification for system throughput and a design specification for system reliability while lightening a designer's burden, and of which cost falls within the allowable range.

That is, in the present invention, the designing of system reliability is performed after the designing of system throughput, and subsequently the cost evaluation is performed. During these designing and evaluation, the invention is constructed so that the system-idea data can be referred and utilized mutually. Therefore, there is no need of reattempting the designing of system throughput at the designing stage of system reliability, whereby it is possible to alter either the number of servers contained in the system idea or the number of CPUs in the server while maintaining the system throughput of the system idea more than a design standard value. Accordingly, without going through tangled operations, it is possible to modify the system idea so as to meet a design specification value of system failure reliability while maintaining a design specification of system throughput.

What is claimed is:

1. A computer implemented design supporting system for an IT system, comprising:
   a processor; and
   a memory, communicatively coupled to the processor;
   wherein the computer implemented design supporting system is configured to perform a method comprising:
   inputting data necessary for designing the IT system, the data necessary for designing the IT system comprising: system-design standard information including an initial system idea, a design standard value for throughput, a design standard value for failure probability and an allowable range of cost; throughput-related information including a variation in arrival transaction number, a dependency of throughput of each server group on the number of servers and a dependency of throughput of each server on the number of CPUs; and cost-related information;
   generating a first system idea meeting the design standard value for throughput by performing a simulation representing a relationship between a system throughput and the number of arrival transactions regarding the initial system idea, and extracting a bottleneck part of the system throughput, the first system idea including the following three concepts as improvement idea options: (1) to establish a throughput more than a predetermined throughput in a server; (2) to change the number of servers for a server group based on the dependency of throughput of each server group on the number of servers; and (3) to change the number of CPUs for a server based on the dependency of throughput of each server on the number of CPUs; and storing the first system idea in the memory;
   generating a second system idea meeting the design standard value for failure probability, based on the first system idea by generating a fault tree of the first system idea, converting the fault tree to a logical expression, calculating a system failure probability, performing an analysis of a basic event having a high contribution ratio to the system failure probability, and determining the number of servers or the number of CPUs for the basic event based on the dependency of throughput of each server group on the number of servers or the dependency of throughput of each server on the number of CPUs; and storing the second system idea in the memory;
   evaluating a cost of the second system idea based on the cost-related information, and storing the cost in the memory, the memory storing the first system idea, the second system idea and the cost of the second system idea;
   judging whether the cost of the second system idea is within the allowable range of cost or not;
   judging, by the design supporting system, that the cost of the second system idea is within the allowable range of cost; and
   outputting data including the second system idea to an outside of the design supporting system.

2. The design supporting system for the IT system of claim 1, wherein the method further comprises calculating at least one of:
   an equipment cost of either respective constitutive instruments of the IT system or respective subsystems of the IT system;
   an expected value of an amount of operating damage due to a system failure; and
   an expected value of an amount of equipment damage due to the system failure.

3. The design supporting system for the IT system of claim 1, wherein the method further comprises calculating and then summing at least two of:
   an equipment cost of either respective constitutive instruments of the IT system or respective subsystems of the IT system;
   an expected value of an amount of operating damage due to a system failure; and
   an expected value of an amount of equipment damage due to the system failure.

4. A design supporting method for an IT system, comprising:
   inputting data necessary for a designing of the IT system, the data necessary for the designing of the IT system comprising: system-design standard information including an initial system idea, a design standard value for throughput, a design standard value for failure probability and an allowable range of cost; throughput-related information including a variation in arrival transaction number, a dependency of throughput of each server group on the number of servers and a dependency of throughput of each server on the number of CPUs; and cost-related information;

generating, by a computing system, a first system idea meeting the design standard value for throughput, by performing a simulation representing a relationship between a system throughput and the number of arrival transactions regarding the initial system idea, and extracting a bottleneck part of the system throughput, the first system idea including the following three concepts as improvement idea options: (1) to establish a throughput more than a predetermined throughput in a server; (2) to change the number of servers for a server group based on the dependency of throughput of each server group on the number of servers; and (3) to change the number of CPUs for a server based on the dependency of throughput of each server on the number of CPUs;

generating, by the computing system, a second system idea meeting the design standard value for failure probability, based on the first system idea by generating a fault tree of the first system idea, converting the fault tree to a logical expression, calculating a system failure probability, performing an analysis of a basic event having a high contribution ratio to the system failure probability, and determining the number of servers or the number of CPUs for the basic event based on the dependency of throughput of each server group on the number of servers or the dependency of throughput of each server on the number of CPUs;

evaluating, by the computing system, a cost of the second system idea based on the cost-related information;

judging, by the computing system, whether the cost of the second system idea is within the allowable range of cost or not;

judging, by the computing system, that the cost of the second system idea is within the allowable range of cost; and outputting data including the second system idea to outside of the computing system.

5. The design supporting method for the IT system of claim 4, wherein the method further comprises calculating at least one of:
- an equipment cost of either respective constitutive instruments of the IT system or respective subsystems of the IT system;
- an expected value of an amount of operating damage due to a system failure; and
- an expected value of an amount of equipment damage due to the system failure.

6. The design supporting method for the IT system of claim 4, wherein the method further comprises calculating and then summing at least two of:
- an equipment cost of either respective constitutive instruments of the IT system or respective subsystems of the IT system;
- an expected value of an amount of operating damage due to a system failure; and
- an expected value of an amount of equipment damage due to the system failure.

* * * * *